(12) United States Patent
Higashi et al.

(10) Patent No.: US 7,416,783 B2
(45) Date of Patent: Aug. 26, 2008

(54) RESIN PARTICLES COMPRISING A (METH)ACRYLATE COPOLYMER AND A SURFACTANT HAVING A SULFONIC-ACID OR SULFONATE GROUP

(75) Inventors: Takashi Higashi, Wakayama (JP); Tetsuji Kito, Wakayama (JP); Yasushi Sasaki, Wakayama (JP); Hiromi Nambu, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/590,998

(22) PCT Filed: May 26, 2005

(86) PCT No.: PCT/JP2005/010101

§ 371 (c)(1),
(2), (4) Date: Aug. 29, 2006

(87) PCT Pub. No.: WO2005/116116

PCT Pub. Date: Dec. 8, 2005

(65) Prior Publication Data
US 2007/0184270 A1      Aug. 9, 2007

(30) Foreign Application Priority Data
May 28, 2004 (JP) .............................. 2004-159670
Mar. 8, 2005 (JP) .............................. 2005-063865

(51) Int. Cl.
*B32B 5/16* (2006.01)

(52) U.S. Cl. .................. 428/403; 428/407; 428/447; 428/704; 427/222

(58) Field of Classification Search ............... 428/403, 428/407, 447, 704; 427/212, 222
See application file for complete search history.

(56) References Cited

U.S. PATENT DOCUMENTS

| | | | | |
|---|---|---|---|---|
| 3,787,522 A | * | 1/1974 | Dickie | 428/407 |
| 5,420,218 A | * | 5/1995 | Toribuchi et al. | 526/214 |
| 6,531,113 B1 | | 3/2003 | Mougin et al. | |
| 6,586,097 B1 | * | 7/2003 | Pascault et al. | 428/402 |

FOREIGN PATENT DOCUMENTS

| | | |
|---|---|---|
| DE | 100 61 544 | 6/2002 |
| JP | 2000-186017 | 7/2000 |
| JP | 2000-302624 | 10/2000 |
| JP | 2002-265620 | 9/2002 |
| JP | 2003-146826 | 5/2003 |

* cited by examiner

*Primary Examiner*—H. T Le
(74) *Attorney, Agent, or Firm*—Oblon, Spivak, McClelland, Maier & Neustadt, P.C.

(57) ABSTRACT

The invention relates to crosslinked (meth)acrylate-based resin particles having an average particle diameter of 1 to 10 μm, containing monomer components containing a monomer having a carboxyl group and at least one monomer selected from an acrylate and a methacrylate copolymerized therein, the particles having a surface coated with a surfactant having a sulfonic acid group or a sulfonate group, and a process for producing the same.

18 Claims, 1 Drawing Sheet

RESIN PARTICLES COMPRISING A (METH)ACRYLATE COPOLYMER AND A SURFACTANT HAVING A SULFONIC-ACID OR SULFONATE GROUP

FIELD OF THE INVENTION

The present invention relates to crosslinked (meth)acrylate-based resin particles and a process for producing the same.

BACKGROUND OF THE INVENTION

As makeup powder-containing cosmetics, body cosmetics such as body powder, makeup cosmetics such as foundation cream, and lotions such as body lotion are commercially available. For the purpose of conferring functions such as improvement in extendability on the skin, improvement in feeling and a wrinkle-hiding effect, these makeup powder-containing cosmetics are blended with resin particles such as polymethyl methacrylate particles, crosslinked polystyrene particles and polyethylene particles.

JP-A 2000-186017 discloses resin particles of crosslinked (meth)acrylate-based resin particles having a compression strength of 0.05 to 0.6 kgf/mm$^2$, wherein the surface of the resin particles is coated with an inorganic powder.

JP-A 2002-265620 discloses wetted resin particles containing an aqueous solution of an organic solvent in crosslinked (meth)acrylate-based resin particles having a compression strength of 0.01 to 0.6 kgf/mm$^2$ upon 10% deformation.

JP-A 2000-302624 discloses (meth)acrylate-based resin particles adhering an organic resin fine particles to the surfaces of the resin particles.

SUMMARY OF THE INVENTION

The present invention provides crosslinked (meth)acrylate-based resin particles having an average particle diameter of 1 to 10 μm, comprising a copolymer obtained by copolymerization of monomer components comprising a monomer having a carboxyl group and at least one monomer selected from an acrylic ester and a methacrylic ester (referred to hereinafter as (meth)acrylate monomer), wherein the surface of the resin particles is coated with a surfactant having a sulfonic acid group or a sulfonate group (referred to hereinafter as sulfonic acid (salt) group), and a process for producing the same.

DETAILED DESCRIPTION OF THE INVENTION

The polymethyl methacrylate particles are excellent in respect of conferring excellent extendability on cosmetics, but are unsatisfactory in respect of endowing soft and smooth feeling.

Particles such as those in JP-A 2000-186017 have excellent extendability and feeling, but are still not satisfactory, and there is still need for particles simultaneously having more excellent extendability and feeling such as smoothness and soft feeling.

The wetted resin particles disclosed in JP-A 2002-265620 have smooth feeling upon incorporation into cream, ointment, emulsion etc., but because the resin particles have wetting properties, dry feeling cannot be given, so there is demand for resin particles having more excellent feeling when used alone and when blended.

The present invention provides resin particles which confer not only extendability and smoothness but also dry feeling on cosmetics, and in themselves, have smoothness and dry feeling, as well as a process for producing the same.

The crosslinked (meth)acrylate-based resin particles of the present invention, even when the particles are used alone, have smoothness and dry feeling, and when used by incorporation into cosmetics, exhibit smooth and dry feeling in use.

[Resin Particles]

The resin particles of the present invention are crosslinked (meth)acrylate-based resin particles comprising a copolymer obtained by copolymerization of monomer components comprising a monomer having a carboxyl group and (meth)acrylate monomer, wherein the surface of the resin particles is coated with a surfactant having a sulfonic acid (salt) group.

The (meth)acrylate monomer used in the present invention is preferably an alkyl(meth)acrylate whose alkyl group has 1 to 18 carbon atoms. Specific examples include methyl (meth)acrylate, ethyl (meth)acrylate, n-butyl (meth)acrylate, isobutyl (meth)acrylate, 2-ethylhexyl (meth)acrylate, lauryl (meth)acrylate, stearyl (meth)acrylate etc. Among these monomers, alkyl (meth)acrylates whose alkyl group has 4 to 18 carbon atoms, such as butyl (meth)acrylate, lauryl (meth)acrylate, stearyl (meth)acrylate etc., are particularly preferable. A combination of a plurality of such monomers may be used. The proportion of the (meth)acrylate monomer in the total monomer components (including crosslinking monomers; this hereinafter applies) is preferably 30 to 98% by weight, more preferably 50 to 85% by weight.

In this specification, "(meth)acryl" is a concept including both acryl and methacryl.

The monomer having a carboxyl group used in the present invention includes (meth)acrylic acid, maleic acid, fumaric acid, crotonic acid, itaconic acid etc. A plurality of such monomers may be used in combination. The proportion of the monomer having a carboxyl group in the total monomer components is preferably 0.1 to 30% by weight, more preferably 1 to 10% by weight, from the viewpoint of giving excellent powdery feeling (smoothness, dry feeling).

Carboxyl groups contained in the resin particles of the present invention may be partially neutralized. A base for this neutralization is preferably sodium hydroxide, potassium hydroxide, ammonia etc., but organic bases such as amines, basic amino acids etc. can also be used. From the viewpoint of improving the smoothness and dry feeling of the particles, the degree of neutralization is preferably 1 to 30%, more preferably 1 to 20%.

Here, the "degree of neutralization" refers to the ratio, expressed on percentage, of the molar ratio of the added base to the molar ratio of the carboxyl group of the monomer having a carboxyl group.

The monomer components of the present invention preferably contain a crosslinking monomer having 2 or more vinyl groups as a crosslinking agent. Such crosslinking monomers include (meth)acrylate-based crosslinking monomers such as ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, 1,3-butylene glycol di(meth)acrylate, 1,4-butane diol di(meth)acrylate, 1,6-hexane diol di(meth)acrylate, glycerin di(meth)acrylate, allyl (meth) acrylate, trimethylol propane tri(meth) acrylate, pentaerythritol tetra(meth)acrylate, phthalic diethylene glycol di(meth)acrylate, caprolactone-modified dipentaerythritol hexa(meth) acrylate, caprolactone-modified hydroxypivalate neopentyl glycol di(meth)acrylate, polyester (meth)acrylate, urethane (meth)acrylate etc., and aromatic divinyl monomers such as divinyl benzene, divinyl naphthalene and derivatives thereof. These may be used alone or as a mixture of two or more thereof. Among these crosslinking monomers, (poly)alkylene glycol di(meth)acrylates such as ethylene glycol di(meth)acrylate, diethylene glycol di(meth)acrylate, triethylene glycol di(meth)acrylate, 1,3-butylene glycol di(meth)acrylate, 1,4-butane diol di(meth)acrylate, 1,6-hexane diol di(meth)acrylate etc., caprolactone-modified dipentaerythritol hexa(meth)acrylate, caprolactone-modified hydroxypivalate neopentyl glycol di(meth)acrylate and polyester (meth)acrylate are particularly suitable for applications such as cosmetics etc. because of low stimulation to the skin. These crosslinking monomers are used preferably in an amount of 3 to 50% by weight relative to the total monomer components.

Besides the (meth)acrylate monomer, the monomer having a carboxyl group and the crosslinking monomer, other monomers copolymerizable therewith can be copolymerized in the present invention in such a range that the effect of the present invention is not inhibited. The other monomers include styrene, (meth)acrylonitrile, (meth)acrylamide, vinyl acetate, vinyl pyrrolidone, polysiloxane modified at one end with (meth)acryloyl, etc.

The resin particles of the present invention are coated thereon with a surfactant having a sulfonic acid (salt) group. The resin particles having smoothness and dry feeling can thereby be obtained. The term "coated" means that the surfactant is present on at least a part of the surface of the resin particle. The surfactant having a sulfonic acid (salt) group means a surfactant having a sulfonic acid group or a neutralized sulfonic acid group.

The proportion of the surfactant having a sulfonic acid (salt) group in the resin particles of the present invention is preferably 0.01 to 50 parts by weight, more preferably 0.01 to 10 parts by weight, further more preferably 0.01 to 5 parts by weight, based on 100 parts by weight of the resin particles.

The surfactant having a sulfonic acid (salt) group includes those described in columns 0032 to 0036 in JP-A 2003-146826. In particular, the surfactant is preferably an alkyl or alkenyl ether sulfonic acid (or a salt thereof) having a C5 to C30 alkyl or alkenyl group and optionally having alkylene oxide, 0.5 to 25 moles on average, added to one molecule, or an acylated taurine (or a salt thereof) having a C5 to C30 alkyl or alkenyl group, particularly preferably a compound represented by the following general formula (I):

$$R^1CONR^2CH_2CH_2SO_3M \quad (I)$$

wherein $R^1$ represents an optionally substituted C5 to C30 alkyl or alkenyl group, $R^2$ represents a hydrogen atom or a methyl group, and M represents a hydrogen atom or a cation.

In the general formula (I), $R^1$ is preferably a C6 to C24 alkyl or alkenyl group. Specific examples include hexyl, octyl, nonyl, decyl, undecyl, dodecyl, tetradecyl, hexadecyl, octadecyl, eicosyl, docosyl, tetracosyl, decenyl, dodecenyl, tetradecenyl, hexadecenyl, octadecenyl, eicocenyl etc. A substituent group on the alkyl group or alkenyl group includes a hydroxyl group, carboxyl group, ester group, ether group, amide group etc.

The cation represented by M includes cations such as alkali metals, ammonium, C1 to C22 alkyl or alkenyl amine, C1 to C22 alkanol amine, and basic amino acid salts, among which alkali metal ions such as lithium, sodium, potassium etc. are preferable, and a sodium ion is particularly preferable.

The resin particles of the present invention can be obtained by polymerizing monomer components containing the (meth)acrylate monomer, the monomer having a carboxyl group and the crosslinking monomer in the presence of the surfactant having a sulfonic acid (salt) group by a method such as aqueous suspension polymerization, emulsion polymerization, seed polymerization, dispersion polymerization or the like. Among these methods, the aqueous suspension polymerization method is preferable from the viewpoint of easily obtaining the resin particles.

The aqueous suspension polymerization is carried out by mixing a monomer-containing phase with an aqueous phase and then rising the temperature of the mixture under stirring. In this polymerization, the surfactant having a sulfonic acid (salt) group is used as a dispersant. By this method, the resin particles can be coated with the surfactant having a sulfonic acid (salt) group. After the polymerization, the solvent is removed from the resulting resin particles, whereby the resin particles can be coated with a larger amount of the surfactant having a sulfonic acid (salt) group.

The amount of the surfactant having a sulfonic acid (salt) group is preferably 0.01 to 50 parts by weight, more preferably 0.01 to 10 parts by weight, still more preferably 0.1 to 5 parts by weight, based on 100 parts by weight of the total monomer components.

The polymerization initiator used in polymerization includes, for example, oil-soluble peroxides such as benzoyl peroxide, lauroyl peroxide, octanoyl peroxide, o-chlorobenzoyl peroxide, methyl ethyl ketone peroxide, diisopropylperoxydicarbonate, cumenehydroperoxide, t-butyl hydroperoxide etc., oil-soluble azo compounds such as 2,2'-azobisisobutyronitrile, 2,2'-azobis(2,4-dimethyl valeronitrile) etc. The amount of the polymerization initiator added is preferably 0.1 to 10% by weight based on the total monomer components. The polymerization temperature and polymerization time are not particularly limited, but preferably, the polymerization temperature is 40 to 100° C. and the polymerization time is 1 to 15 hours.

The resin particles of the present invention may be coated thereon with silicone-based polymer compound particles. The term "coated" means that the silicone-based polymer compound particles are present on at least a part of the surface of the resin particle. The fact that the surface of the resin particle is coated with Compounds (A) and (B) means that a part of the resin particle is coated with Compound (A), while a part of the remaining surface is coated with Compound (B). The silicone-based polymer compound used in the present invention is preferably modified silicone having a cation group, from the viewpoint of forming fine particles in water, easy ionic bonding to the resin particle and easy coating on the resin particle. Such modified silicone is exemplified by polyether-modified silicone having a cation group, alkyl-modified silicone having a cation group, higher fatty ester-modified silicone having a cation group, higher alkoxy-modified silicone having a cation group, etc.

The cation group is preferably a group represented by formula (II):

wherein $R^1$ and $R^2$ independently represent a hydrogen atom, a C1 to C18 alkyl group or a C6 to C10 aryl group, and $X^-$ represents a counterion of the quaternary ammonium salt, or a group represented by formula (III)

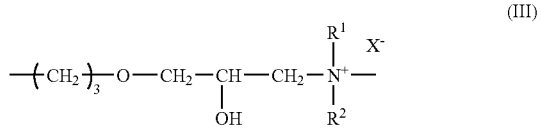

wherein $R^1$, $R^2$ and $X^-$ have the same meanings as defined above.

Further, modified silicone having, via a cation group, a hydrophilic moiety in the end and/or a side chain of a molecular chain of organopolysiloxane is preferable. The hydrophilic moiety is more preferably an polyalkylene oxide chain such as polyethylene oxide, polypropylene oxide etc., or a molecular chain of poly(N-acylalkylene imine) consisting of repeating units represented by formula (IV):

wherein $R^3$ represents a hydrogen atom, a C1 to C22 alkyl group, a C3 to C8 cycloalkyl group, a C7 to C10 aralkyl group or a C6 to C10 aryl group, and n is 2 or 3.

The modified silicone having a cation group is particularly preferably modified silicone having, via a cation group, a molecular chain of poly(N-acylalkylene imine) consisting of repeating units represented by the formula (IV) above in the end and/or a side chain of a molecular chain of organopolysiloxane, wherein the weight ratio of the molecular chain of poly(N-acylalkylene imine) to the molecular chain of organopolysiloxane is preferably 1/50 to 50/1.

The weight-average molecular weight of the silicone-based polymer compound used in the present invention is preferably 500 to 500,000, still more preferably 1,000 to 300,000. When the weight-average molecular weight is 500 or more, sufficient feeling in use can be obtained, while when the molecular weight is 500,000 or less, the sufficient solubility of the silicone-based polymer compound in a solvent can be preferably obtained. The resin particles may be coated with the silicone-based polymer compound particles in the form of primary particles, but are coated more preferably with the silicone-based polymer compound particles in the form of aggregated particles. The average particle diameter of the primary particles is preferably 1 to 1000 nm, more preferably 1 to 100 nm. The average particle diameter of the primary particles of the silicone-based polymer compound can be determined by measuring the median diameter of an aqueous suspension of the silicone-based polymer compound particles at room temperature (20° C.) by using a dynamic light scattering particle-size analyzer (for example, MICROTRAC UPA manufactured by HONEYWELL), under the conditions where that the absolute refractive index of the silicone-based polymer compound particles is 1.40 and the absolute refractive index of water is 1.33. The average particle diameter of the aggregated particles is preferably 50 to 1000 nm, more preferably 100 to 1000 nm. The average particle diameter of the aggregated particles can be obtained from a transmission electron microscopic image.

In the method of coating the resin particles with the silicon-based polymer compound particles, the silicone-based polymer compound is first dissolved in a solvent and then mixed with water to prepare a dispersion having silicone-based polymer compound particles precipitated therein. The solvent is preferably a polar solvent, and the polar solvent is preferably an alcohol. The alcohol is preferably methanol, ethanol or 1-propanol, and particularly ethanol is more preferable. The dispersion is mixed with an aqueous dispersion of the resin particles, whereby the resin particles coated thereon with the silicon-based polymer compound particles can be obtained.

With respect to the ratio of the resin particles to the silicone-based polymer compound particles, the amount of the silicone-based polymer compound particles is preferably 5 to 100 parts by weight based on 100 parts by weight of the resin particles.

By using the resin particles coated thereon with the silicone-based polymer compound particles, cosmetics can be prevented from removing from the skin, to improve the durability of the cosmetics. Further, the resin particles can be endowed with smooth feeling.

From the viewpoint of reducing frictional feeling, the average particle diameter of the resin particles of the invention is 1 μm or more, preferably 1.5 μm or more. From the viewpoint of suppressing grittiness and further improving fixation to the skin, on the other hand, the average particle diameter is 10 μm or less, preferably 8 μm or less, still more preferably 6 μm or less.

The average particle diameter can be determined by measuring the weight-average particle diameter of an aqueous suspension of the particles at room temperature (20° C.) at a relative refractive index of 1.1 by using a laser scattering particle-size analyzer (for example, LA-920 manufactured by Horiba, Ltd.).

The average particle diameter of the resin particles can be suitably determined by controlling the mixing conditions and stirring conditions of the monomers and water and the composition and amount of the dispersant. The mixing conditions and stirring conditions can be controlled by dispersing the mixture by using, for example, a homogenizer or a emulsifying dispersing machine utilizing high shear applied to a gap between a rotating blade and a container wall or between rotating blades, or a sonicating dispersing machine, or by passing the aqueous monomer solution under pressure through a ceramic microscopic porous membrane and injecting a dispersing medium into it.

The shape of the resin particles of the present invention is preferably spherical for good feeling on the skin.

The compression strength of the resin particles of the present invention is preferably not lower than 0.7 kgf/mm$^2$, more preferably not lower than 1 kgf/mm$^2$, from the viewpoint of achieving sufficient dry feeling. The compression strength is preferably not higher than 15 kgf/mm$^2$, more preferably not higher than 10 kgf/mm$^2$, from the viewpoint of achieving sufficient smoothness.

According to the equation below, the compression strength is a value calculated from loading at 10% deformation of the particle and the particle diameter when the resin particles were subjected to a compression test with micro compression testing machine for particles MCT-M200 manufactured by Shimadzu Corporation. The compression strength of the resin particles can be suitably regulated by controlling the type and compounding amount of the monomers and the crosslinking agent constituting the resin particles.

Compression strength (kgf/mm$^2$)=2.8×loading (kgf)/ {π×particle diameter (mm)×particle diameter (mm)}

EXAMPLES

Figure 1:
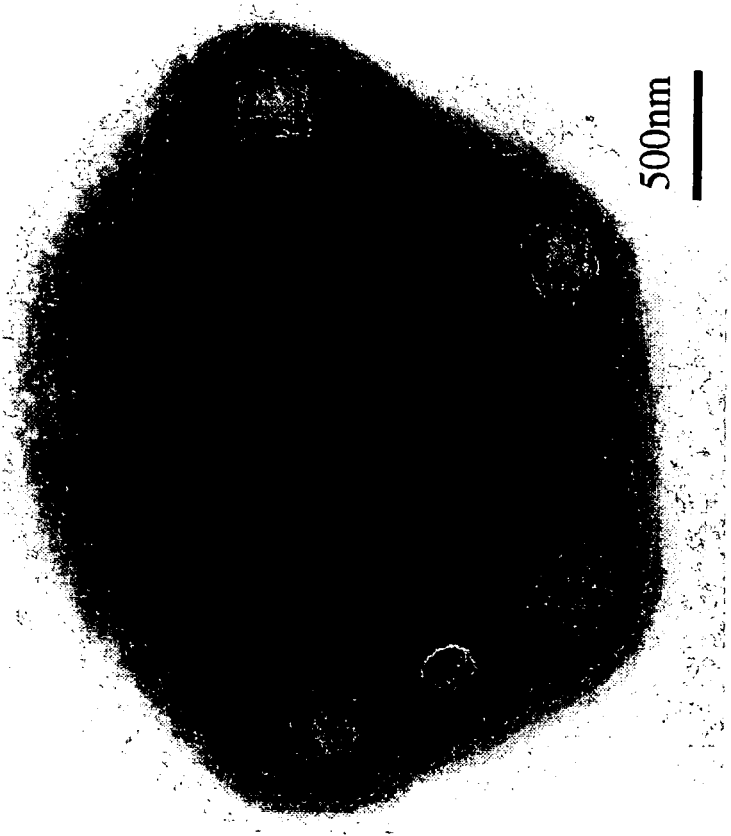
FIG. 1 is a photograph of the resin particles in the Examples under a transmission electron microscope (TEM).

The invention is described in more detail by reference to the following examples. The Examples are merely illustrate the invention and not intended to limit the invention.

Production Example 1

Production Example of poly(N-propanoylethylene imine) graft-dimethylsiloxane γ-aminopropylmethyl siloxane copolymer 7.57 g (0.0491 mol) of diethyl sulfate and 263 g (2.65 mol) of 2-ethyl-2-oxazoline were dissolved in 550 g dehydrated ethyl acetate and refluxed under heating for 15 hours in a nitrogen atmosphere to give terminal-reactive poly(N-propionylethylene imine). 33% solution of 250 g side chain primary aminopropyl-modified polydimethyl siloxane (KF-864 manufactured by Shin-Etsu Chemical Co., Ltd.) in ethyl acetate was added all at once thereto and heated under reflux for 12 hours. The reaction mixture was concentrated under reduced pressure to give N-propionylethylene imine/dimethyl siloxane copolymer as pale yellow solid (500 g, yield 98%). The weight-average molecular weight was 88,400. As a result of neutralization titration with hydrochloric acid with methanol as solvent, it was found that no amino acid remained.

The weight ratio of the molecular chain of poly(N-propanoylethylene imine)/the molecular chain of organopolysiloxane in the resulting copolymer is 49/51.

Example 1

82 g lauryl methacrylate (LMA), 3 g methacrylic acid (MAA), 15 g ethylene glycol dimethacrylate (EGDMA) and 2 g lauroyl peroxide were introduced into a beaker, mixed and dissolved under stirring. 400 g of ion-exchanged water having 0.75 g sodium N-stearoyl-N-methyl taurate (SMT) dissolved therein was added thereto and dispersed with a homomixer until the particle diameter became 2.2 μm.

This dispersion was poured into a four-necked flask, and the atmosphere in the flask was replaced over 30 minutes under stirring by nitrogen. The temperature in the flask was risen to 80° C. with an oil bath, and after 80° C. was reached, the mixture was polymerized for 5 hours and then cooled to room temperature. A dispersion of polymerized particles was neutralized by adding 3.9 g of 1 N NaOH dropwise, to give a dispersion of resin particles.

The dispersion of resin particles was lyophilized to remove water to give resin particles.

By analyzing the surfaces of the resin particles with an X-ray electron spectroscopy for chemical analysis (ESCA), nitrogen atoms possessed by only SMT could be confirmed to be present on the surfaces of the particles.

Example 2

10 g of the copolymer obtained in Production Example 1 and 30 g ethanol were introduced into a beaker, mixed and dissolved under stirring. 70 g ion-exchanged water was added thereto, and the solution was mixed and stirred to give an aqueous dispersion of silicone-based polymer compound particles having an average particle diameter of 18 nm.

The average particle diameter of the silicone-based polymer compound particles was measured by the following method.

[Method of Measuring the Average Particle Diameter]

The average particle diameter of the aqueous dispersion of silicone-based polymer compound particles was determined by measuring the median diameter with a dynamic light scattering particle-size analyzer (MICROTRAC 9340-UPA manufactured by HONEYWELL) under the conditions where that the absolute refractive index of the silicone-based polymer compound particles was 1.40 and the absolute refractive index of water was 1.33.

The aqueous dispersion of the silicone-based polymer compound particles was added to the resin particle dispersion obtained in Example 1 and then stirred. In this step, the silicone-based polymer compound particles adhered to the surfaces of the resin particles. After stirring, the dispersion was lyophilized to remove water to give resin particles.

When the resin particles were photographed under a transmission electron microscope (TEM), it could be confirmed that the resin particles were coated with the silicone-based polymer compound particles, as shown in FIG. 1.

Example 3

82 g stearyl methacrylate (SMA), 3 g methacrylic acid, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 2.4 μm.

This dispersion was poured into a four-necked flask, and resin particles were obtained by the same procedure as in Example 1.

Nitrogen atoms possessed by only SMT could be confirmed to be present on the surfaces of the resin particles similar to those in Example 1.

Example 4

82 g butyl acrylate (BA), 3 g methacrylic acid, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 3.5 μm.

This dispersion was poured into a four-necked flask, and resin particles were obtained by the same procedure as in Example 1.

Nitrogen atoms possessed by only SMT could be confirmed to be present on the surfaces of the resin particles similar to those in Example 1.

Example 5

96 g lauryl methacrylate, 3 g methacrylic acid, 1 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 4.5 μm.

This dispersion was poured into a four-necked flask, and resin particles were obtained by the same procedure as in Example 1.

Nitrogen atoms possessed by only SMT could be confirmed to be present on the surfaces of the resin particles similar to those in Example 1.

Example 6

47 g lauryl methacrylate, 3 g methacrylic acid, 50 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 4.0 µm.

This dispersion was poured into a four-necked flask, and resin particles were obtained by the same procedure as in Example 1.

Nitrogen atoms possessed by only SMT could be confirmed to be present on the surfaces of the resin particles similar to those in Example 1.

Example 7

82 g lauryl methacrylate, 3 g methacrylic acid, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 2.2 µm.

This dispersion was poured into a four-necked flask, and the atmosphere in the flask was replaced over 30 minutes under stirring by nitrogen. The temperature in the flask was risen to 80° C. with an oil bath, and after 80° C. was reached, the mixture was polymerized for 5 hours and then cooled to room temperature. A dispersion of polymerized particles was lyophilized to remove water to give resin particles.

Nitrogen atoms possessed by only SMT could be confirmed to be present on the surfaces of the resin particles similar to those in Example 1.

Comparative Example 1

82 g lauryl methacrylate, 3 g methacrylic acid, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 0.9 µm.

This dispersion was poured into a four-necked flask, and resin particles were obtained by the same procedure as in Example 1.

Comparative Example 2

82 g lauryl methacrylate, 3 g methacrylic acid, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 11 µm.

This dispersion was poured into a four-necked flask, and resin particles were obtained by the same procedure as in Example 1.

Comparative Example 3

85 g lauryl methacrylate, 15 g ethylene glycol dimethacrylate and 2 g lauroyl peroxide were introduced into a beaker, mixed and dissolved under stirring. 400 g ion-exchanged water having 0.75 g sodium N-stearoyl-N-methyl taurate dissolved therein was added thereto and dispersed with a homomixer until the particle diameter became 2.4 µm.

This dispersion was poured into a four-necked flask, and resin particles were obtained by the same procedure as in Example 7.

Comparative Example 4

82 g lauryl methacrylate, 3 g methacrylic acid, 15 g ethylene glycol dimethacrylate and 2 g lauroyl peroxide were introduced into a beaker, mixed and dissolved under stirring. 400 g ion-exchanged water having 0.75 g sodium dodecyl sulfate (SDS) dissolved therein was added thereto and dispersed with a homomixer until the particle diameter became 2.5 µm.

This dispersion was poured into a four-necked flask, and resin particles were obtained by the same procedure as in Example 1.

Comparative Example 5

82 g lauryl methacrylate, 3 g methacrylic acid, 15 g ethylene glycol dimethacrylate and 2 g lauroyl peroxide were introduced into a beaker, mixed and dissolved under stirring. 400 g ion-exchanged water having 1.5 g polyvinyl alcohol (PVA, GOHSENOL EG-30, manufactured by The Nippon Synthetic Chemical Industry Co., Ltd.) dissolved therein was added thereto and dispersed with a homomixer until the particle diameter became 5.8 µm.

This dispersion was poured into a four-necked flask, and resin particles were obtained by the same procedure as in Example 1.

The compositions of the resin particles in Examples 1 to 7 and Comparative Examples 1 to 5 are collectively shown in Table 1. The average particle diameter and compression strength of these resin particles were measured by the following methods, and their smoothness and dry feeling were evaluated by the following methods. These results are shown in Table 1.

[Method of Measuring the Average Particle Diameter]

As the average particle diameter, a median diameter was determined by measuring the particle diameters of the resin particles under the conditions where the relative refractive index was 1.10 (the refractive index of the resin particles was 1.46, and the refractive index of water was 1.33) by a laser scattering particle-size analyzer LA920 manufactured by Horiba, Ltd.

[Method of Measuring Compression Strength]

The resin particles were measured by a compression test with a constant loading rate of 29 mgf/s up to 1 gf with a micro compression testing machine for particle MCT-M200 manufactured by Shimadzu Corporation. The compression strength was calculated from a loading at 10% deformation of the particle diameter and the particle diameter according to the following equation. 10 samples were measured and an average was expressed as compression strength.

Compression strength $(kgf/mm^2)$=2.8×loading (kgf)/ {π×particle diameter (mm)×particle diameter (mm)}

[Method of Evaluating Smoothness]

0.2 g resin particles were applied uniformly with fingers onto the forearm at room temperature under normal humidity, and then evaluated sensorily for the absence of grittiness and smooth feeling by rubbing with fingers, and scored according to the following criteria:

⊙: Very smooth without gritty feeling.
○: Smooth and hardly gritty.
Δ: Not very smooth with slight gritty feeling.
×: Not smooth with significant grittiness.

[Method of Evaluating Dry Feeling]

0.2 g resin particles were applied uniformly with fingers onto the forearm at room temperature under normal humidity, and then evaluated sensorily for dry feeling by rubbing with fingers, and scored according to the following criteria:

⊙: very dry.
○: dry.
Δ: gritty.
×: very gritty.

[Method of Evaluating Durability of Smoothness and Dry Feeling]

0.2 g resin particles were applied uniformly with fingers onto the forearm at room temperature under normal humidity, and one hour after the application, evaluated sensorily for smoothness and dry feeling.

⊙: Very excellent in smoothness and very dry.
○: Excellent in smoothness and dry.
Δ: slightly poor in smoothness and gritty.
×: Poor in smoothness and very gritty.

TABLE 1

| | | Example | | | | | | |
|---|---|---|---|---|---|---|---|---|
| | | 1 | 2 | 3 | 4 | 5 | 6 | 7 |
| Monomer composition (weight ratio) | | MAA/LMA/ EGDMA = 3/82/15 | MAA/LMA/ EGDMA = 3/82/15 | MAA/SMA/ EGDMA = 3/82/15 | MAA/BA/ EGDMA = 3/82/15 | MAA/LMA/ EGDMA = 3/96/1 | MAA/LMA/ EGDMA = 3/47/50 | MAA/LMA/ EGDMA = 3/82/15 |
| Degree of neutralization (%) | | 11.2 | 11.2 | 11.2 | 11.2 | 11.2 | 11.2 | 0 |
| Kind of dispersant | | SMT | SMT | SMT | SMT | SMT | SMT | SMT |
| Kind of silicone-based fine polymer particles | | — | ※1 | — | — | — | — | — |
| Resin particles | Average particle diameter | 2.2 | 2.2 | 2.4 | 3.5 | 4.5 | 4.0 | 2.2 |
| | Compression strength $(kgf/mm^2)$ | 5.0 | 5.0 | 3.5 | 5.8 | 0.8 | 15 | 5.0 |
| Result of evalution | Smoothness | ⊙ | ⊙ | ⊙ | ⊙ | ⊙ | ○ | ○ |
| | Dry feeling | ⊙ | ⊙ | ⊙ | ⊙ | ○ | ⊙ | ○ |
| | Durability | ○ | ⊙ | ○ | ○ | ○ | ○ | ○ |

| | | Comparative example | | | | |
|---|---|---|---|---|---|---|
| | | 1 | 2 | 3 | 4 | 5 |
| Monomer composition (weight ratio) | | MAA/LMA/ EGDMA = 3/82/15 | MAA/LMA/ EGDMA = 3/82/15 | LMA/ EGDMA 85/15 | MAA/LMA/ EGDMA = 3/82/15 | MAA/LMA/ EGDMA = 3/82/15 |
| Degree of neutralization (%) | | 11.2 | 11.2 | — | 11.2 | 11.2 |
| Kind of dispersant | | SMT | SMT | SMT | SDS | PVA |
| Kind of silicone-based fine polymer particles | | — | — | — | — | — |
| Resin particles | Average particle diameter | 0.9 | 11 | 2.4 | 2.5 | 5.8 |
| | Compression strength $(kgf/mm^2)$ | 7.1 | 4.3 | 1.6 | 5.0 | 4.6 |
| Result of evalution | Smoothness | Δ | × | × | × | × |
| | Dry feeling | × | ○ | Δ | Δ | Δ |
| | Durability | ○ | × | Δ | ○ | ○ |

※1: Poly (N-propanoylethyleneimine) graft-dimethyl siloxane-γ-aminopropylmethyl siloxane copolymer
Symbols in the table have the following meanings.
MAA: methacrylic acid
LMA: lauryl methacrylate
SMA: stearyl methacrylate
BA: butyl acrylate
EGDMA: ethylene glycol dimethacrylate
SMT: sodium N-stearoyl-N-methyl taurate
SDS: sodium dodecyl sulfate
PVA: polyvinyl alcohol

The invention claimed is:

1. Crosslinked (meth)acrylate-based resin particles having an average particle diameter of 1 to 10 μm, comprising a copolymer obtained by copolymerization of monomer components comprising a monomer having a carboxyl group and at least one monomer selected from an acrylic ester and a methacrylic ester, wherein the surface of the resin particles is coated with a surfactant having a sulfonic acid group or a sulfonate group.

2. The resin particles according to claim 1, wherein the degree of neutralization of the carboxyl groups in the resin particles is 1 to 30%.

3. The resin particles according to claim 1, having a compression strength of 0.7 to 15 kgf/mm$^2$.

4. The resin particles according to claim 3, wherein the compression strength is 1 to 10 kgf/mm$^2$.

5. The resin particles according to claim 1, further coated on the surface with silicone-based polymer compound particles.

6. The resin particles according to claim 5, wherein the silicone-based polymer compound particles are derived from a modified silicone having a cation group.

7. The resin particles according to claim 6, wherein the cation group is a group represented by the following formula (II) or formula (III):

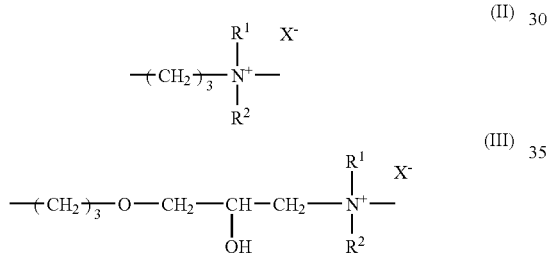

wherein $R^1$ and $R^2$ independently represent a hydrogen atom, a C1 to C18 alkyl group or a C6 to C10 aryl group, and $X^-$ represents a counterion of a quaternary ammonium salt.

8. The resin particles according to claim 6, wherein the modified silicone having a cation group is a modified silicone having, via the cation group, a molecular chain of poly(N-acylalkylene imine) consisting of repeating units represented by the following formula (IV) in the end and/or a side chain of a molecular chain of an organopolysiloxane:

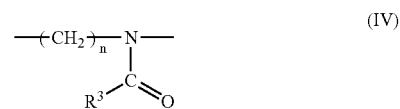

wherein $R^3$ represents a hydrogen atom, a C1 to C22 alkyl group, a C3 to C8 cycloalkyl group, a C7 to C10 aralkyl group or a C6 to C10 aryl group, and n is 2 or 3.

9. The resin particles according to claim 8, wherein the weight ratio of the molecular chain of poly(N-acylalkylene imine) to the molecular chain of organopolysiloxane is 1/50 to 50/1.

10. The resin particles according to claim 1, wherein the surfactant is present in an amount of 0.01 to 50 parts by weight, based on 100 parts by weight of the resin particles.

11. The resin particles according to claim 10, wherein the amount is 0.01 to 5 parts by weight, based on 100 parts by weight of the resin particles.

12. The resin particles according to claim 1, wherein the average particle diameter is 1.5 to 6 μm.

13. The resin particles according to claim 1, wherein the surfactant is an acylated taurine, or a salt thereof, having the following formula (I):

$$R^1CONR^2CH_2CH_2SO_3M \quad (I)$$

wherein $R^1$ represents an optionally substituted C5 to C30 alkyl or alkenyl group, $R^2$ represents a hydrogen atom or a methyl group, and M represents a hydrogen atom or a cation.

14. The resin particles according to claim 13, wherein the taurine or salt thereof is sodium N-stearoyl-N-methyl taurate.

15. The resin particles according to claim 1, wherein the proportion of the (meth)acrylate monomer is 30 to 98 by weight of the total monomer components.

16. The resin particles according to claim 1, wherein the proportion of the monomer having a carboxyl group is 0.1 to 30 by weight of the total monomer components.

17. A process for producing the crosslinked (meth)acrylate-based resin particles of claim 1, which comprises copolymerizing monomer components in the form of dispersion comprising a monomer having a carboxyl group and at least one monomer selected from an acrylic ester and a methacrylic ester, in the presence of a surfactant having a sulfonic acid group or a sulfonate group as a dispersant.

18. A method comprising applying a cosmetic composition which comprises the resin particles according to claim 1 to the skin.

* * * * *